(12) United States Patent
Kim et al.

(10) Patent No.: US 9,838,130 B2
(45) Date of Patent: Dec. 5, 2017

(54) BI-DIRECTIONAL OPTICAL TRANSCEIVER MODULE

(71) Applicants: SK TELECOM CO., LTD., Seoul (KR); LIGHTRON INC., Daejeon (KR)

(72) Inventors: Hongman Kim, Daejeon (KR); Wolyon Hwang, Daejeon (KR); Youngun Heo, Daejeon (KR); Yoonkoo Kwon, Cheongju-si (KR); Jinsoo Choi, Daejeon (KR); Kangyong Jung, Daejeon (KR); Jaehyun Jin, Suwon-si (KR); Youngjoon Yoo, Yongin-si (KR); Jinsoo Sung, Seongnam-si (KR); Jongyeong Lim, Goyang-si (KR); Sangsu Park, Yongin-si (KR)

(73) Assignees: SK TELECOM CO., LTD., Seoul (KR); LIGHTRON INC., Daejeon (KR)

( * ) Notice: Subject to any disclaimer, the term of this patent is extended or adjusted under 35 U.S.C. 154(b) by 0 days.

(21) Appl. No.: 14/546,374

(22) Filed: Nov. 18, 2014

(65) Prior Publication Data

US 2015/0071650 A1 Mar. 12, 2015

Related U.S. Application Data

(63) Continuation of application No. PCT/KR2013/001134, filed on Feb. 14, 2013.

(30) Foreign Application Priority Data

May 18, 2012 (KR) .................. 10-2012-0052763
Jan. 11, 2013 (KR) .................. 10-2013-0003577

(51) Int. Cl.
*H04B 10/40* (2013.01)
*H04B 10/25* (2013.01)
(Continued)

(52) U.S. Cl.
CPC .......... *H04B 10/40* (2013.01); *G02B 6/4206* (2013.01); *G02B 6/4214* (2013.01);
(Continued)

(58) Field of Classification Search
CPC ............... H04B 10/40; H04B 10/2504; G02B 6/4206–6/4207; G02B 6/4214–6/4215; G02B 6/4246
See application file for complete search history.

(56) References Cited

U.S. PATENT DOCUMENTS 4,422,181 A * 12/1983 Grafton .................. H04B 10/40 398/139
5,594,578 A * 1/1997 Ainslie ................ H04B 10/272 385/24

(Continued)

FOREIGN PATENT DOCUMENTS

KR 1020060035448 A 4/2006
KR 1020070034654 A 3/2007
(Continued)

OTHER PUBLICATIONS

International Search Report for PCT/KR2013/001134 dated Mar. 29, 2013.
(Continued)

*Primary Examiner* — David Payne
*Assistant Examiner* — Casey Kretzer
(74) *Attorney, Agent, or Firm* — Hauptman Ham, LLP

(57) ABSTRACT

A bi-directional optical transceiver module includes: an optical transmission unit to output a transmission signal; an optical reception unit to receive a reception signal, the transmission signal and the reception signal having different corresponding first and second wavelength values within a single channel; a splitter, inclined with respect to an incident direction of the transmission signal output from the optical
(Continued)

transmission unit, to transmit the transmission signal to an outside, and reflect optical signals input from the outside, the optical signals including the reception signal; and a reflected light-blocking optical filter unit to pass, as the reception signal among the optical signals reflected by the splitter, an optical signal within a preset wavelength range including the second wavelength value.

9 Claims, 10 Drawing Sheets

(51) Int. Cl.
G02B 6/42 (2006.01)
H04J 14/02 (2006.01)
(52) U.S. Cl.
CPC ......... *G02B 6/4215* (2013.01); *G02B 6/4246* (2013.01); *G02B 6/4263* (2013.01); *H04B 10/2503* (2013.01); *H04J 14/02* (2013.01); *H04J 14/0265* (2013.01); *H04J 14/0279* (2013.01)

(56) References Cited

U.S. PATENT DOCUMENTS

| 6,211,916 | B1* | 4/2001 | Hawkins | G02B 3/0012 348/340 |
| 2002/0110313 | A1 | 8/2002 | Anigbo et al. | |
| 2002/0149861 | A1* | 10/2002 | Yonemura | G02B 7/027 359/808 |
| 2004/0017967 | A1* | 1/2004 | Tajima | G02B 6/3562 385/24 |
| 2005/0180755 | A1* | 8/2005 | Masahiko | H04B 10/40 398/135 |
| 2007/0154216 | A1* | 7/2007 | Kim | H04J 14/02 398/71 |
| 2008/0101796 | A1* | 5/2008 | Iida | H04B 10/40 398/41 |
| 2011/0044696 | A1* | 2/2011 | Lim | H04B 10/40 398/139 |

FOREIGN PATENT DOCUMENTS

| KR | 1020070098959 A | 10/2007 |
| KR | 2011-0011123 A | 2/2011 |
| KR | 1020110021185 A | 3/2011 |
| KR | 101040316 B1 | 6/2011 |
| KR | 1020120009785 A | 2/2012 |

OTHER PUBLICATIONS

European Search Report for corresponding European Patent Application No. 13790893.5 dated Apr. 8, 2016.

* cited by examiner

BI-DIRECTIONAL OPTICAL TRANSCEIVER MODULE

CROSS-REFERENCE TO RELATED APPLICATION

The instant application is a continuation of PCT/KR2013/001134, filed on Feb. 14, 2013, which is based on and claims priority to Korean Patent Application No. 10-2012-0052763 filed on May 18, 2012 and No. 10-2013-0003577, filed on Jan. 11, 2013. The disclosures of above-listed applications are hereby incorporated by reference herein in their entirety.

TECHNICAL FIELD

The present disclosure relates to a bi-directional optical transceiver module that performs optical reception/transmission in a CWDM single channel.

BACKGROUND ART

The statements in this section merely provide background information related to the present disclosure and do not constitute prior art.

In order to meet recently increasing data traffic, capacity expansion of existing optical communication networks is developed.

For this reason, the Wavelength-Division Multiplexing (WDM) has been recognized as the leading alternative among various optical communication system technologies which have been proposed up to now.

The WDM technology is a wavelength division multiplexing method which binds and sends light having different wavelengths through a single strand of optical fiber. The WDM technology provides a point-to-point dedicated channel for each subscriber through the independent allocation of wavelengths, each of which is inherent to one subscriber, and uses an inherent optical wavelength for each subscriber. Thus, the WDM technology is capable of providing a high speed service.

For example, a WDM-PON (WDM Passive Optical Network) technology has advantages in that since the WDM-PON uses many wavelengths as compared to a TDM (Time-Division Multiplexing)-PON, such as an E-PON (Ethernet-PON) or a G-PON (Gigabit-PON), which is a time division method, a bi-directional symmetric service is assured and bandwidths are independently allocated, and since signals with different wavelengths are received only by corresponding subscribers, security is excellent.

One of the requirements in the WDM-PON is that optical terminal devices are irrelevant to used wavelengths. The inventor(s) has noted that when this is not satisfied, various kinds of optical terminals corresponding to the number of used optical wavelengths are needed. The inventor(s) has noted that in such a case, considerable difficulties are caused in manufacturing, management, and installation of optical terminal devices.

In order to apply bi-directional optical modules in a CWDM method, the inventor(s) has noted that each of the modules applied to transmission and reception uses 9 channels among 18 CWDM channels. The inventor(s) has experienced that the CWDM method halves optical line use efficiency. Accordingly, technologies that use a single channel in upstream (subscriber→central station) and downstream (central station→subscriber) signal transmissions have been proposed. However, the inventor(s) has experienced that use of a single channel causes a link fail between optical communication networks due to reflection and backscattering on an optical line.

SUMMARY

In accordance with some embodiments of the present disclosure, a bi-directional optical transceiver module comprises an optical transmission unit, an optical reception unit, a splitter, and a reflected light-blocking optical filter unit. The optical transmission unit is configured to output a transmission signal. The optical reception unit is configured to receive a reception signal, the transmission signal and the reception signal having different corresponding first and second wavelength values within a single channel. The splitter is inclined with respect to an incident direction of the transmission signal output from the optical transmission unit, and is configured to transmit the transmission signal to an outside, and to reflect optical signals input from the outside, the optical signals including the reception signal. And the reflected light-blocking optical filter unit is configured to pass, as the reception signal among the optical signals reflected by the splitter, an optical signal within a preset wavelength range including the second wavelength value.

In accordance with some embodiments of the present disclosure, an optical communication system comprises a plurality of bi-directional optical transceiver modules and a multiplexer/demultiplexer. The plurality of bi-directional optical transceiver modules are configured to transmit and receive a plurality of transmission signals and reception signals having different wavelength values in a single channel. And the multiplexer/demultiplexer is connected to the plurality of bi-directional optical transceiver modules, and configured to multiplex or inverse-multiplex the plurality of transmission signals and reception signals having different wavelengths.

DETAILED DESCRIPTION

Figure 1:
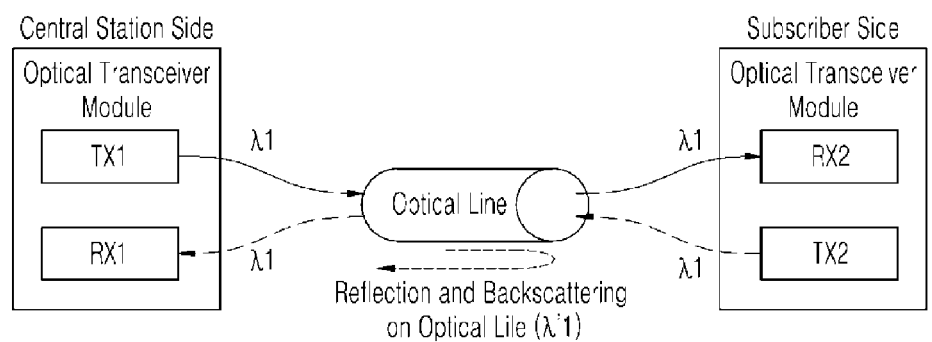
FIG. 1 is a schematic view of an optical communication using the same wavelength in a Coarse-Wave-Division Multiplexing (CWDM) single channel in upstream and downstream signal transmission and reception.

The present disclosure is to provide a bi-directional optical transceiver module which is configured to prevent a link fail between optical communication networks due to reflection and backscattering on an optical line in a bi-directional optical transceiver module that performs optical transmission/reception in a state where an upstream signal and a downstream signal have different wavelength values in a CWDM single channel.

Hereinafter, embodiments of the present disclosure will be described in more detail. It should be noted that the same components of the drawings are designated by the same reference numeral anywhere. Further, a detailed description of known functions and configurations incorporated herein will be omitted.

FIG. 1 is a schematic view of an optical communication using a same wavelength in a Coarse-Wave-Division Multiplexing (CWDM) single channel in upstream and downstream signal transmission and reception.

In a CWDM system, 18 channels may be configured at a 20 nm interval from a first channel, of which the central wavelength is 1270 nm, to a last channel, of which the central wavelength is 1610 nm.

Here, a protection band of 2.5 nm is allocated at each side of a ±7.5 nm range. 20 nm allocated in this manner forms one band, and a difference of 5 nm is placed between each two adjacent bands so that channels having a total interval of 20 nm are formed.

As illustrated in FIG. 1, a transmission unit TX1 and a reception unit RX1 of a central station side optical transceiver module, and a transmission unit TX2 and a reception unit RX2 of a subscriber side optical transceiver module are configured to perform upstream and downstream signal transmission and reception through any one channel among 18 CWDM channels. Other components of the central station side optical transceiver module, such as the transmission unit TX1 and the reception unit RX1 comprise one or more processors and/or application-specific integrated circuits (ASICs). Other components of the subscriber side optical transceiver module, such as the transmission unit TX2 and the reception unit RX2 comprise one or more processors and/or application-specific integrated circuits (ASICs).

An optical communication using a single wavelength λ1 for upstream and downstream signal transmission and reception has an advantage in that a configuration of a multiplexer/demultiplexer is simplified and thus, the entire system configuration costs may be reduced by using one WDM filter per each communication channel. However, there are technical problems to be solved before using such an advantage.

One of the problems to be solved is that reflection components and a backscattering λ"1 by a signal sent from a predetermined direction and a signal sent from an opposite direction cause interference, thereby degrading performance of a system. A representative example of such backscattering is a Rayleigh backscattering. The Rayleigh backscattering refers to an optical signal component which is generated by impurities within an optical fiber when an optical signal passes through the optical fiber, and is returned.

In addition, the reflection components may be generated by, for example, a defective connection of a passive element or an optical fiber. In a case of bi-directional transmission, the reflection components and backscattering λ"1 cause interference with a signal sent from the opposite direction.

The present disclosure relates to a bi-directional optical transceiver module which is capable of preventing link fail between optical communication networks by the reflection and/or backscattering λ"1 on an optical line.

Figure 2:
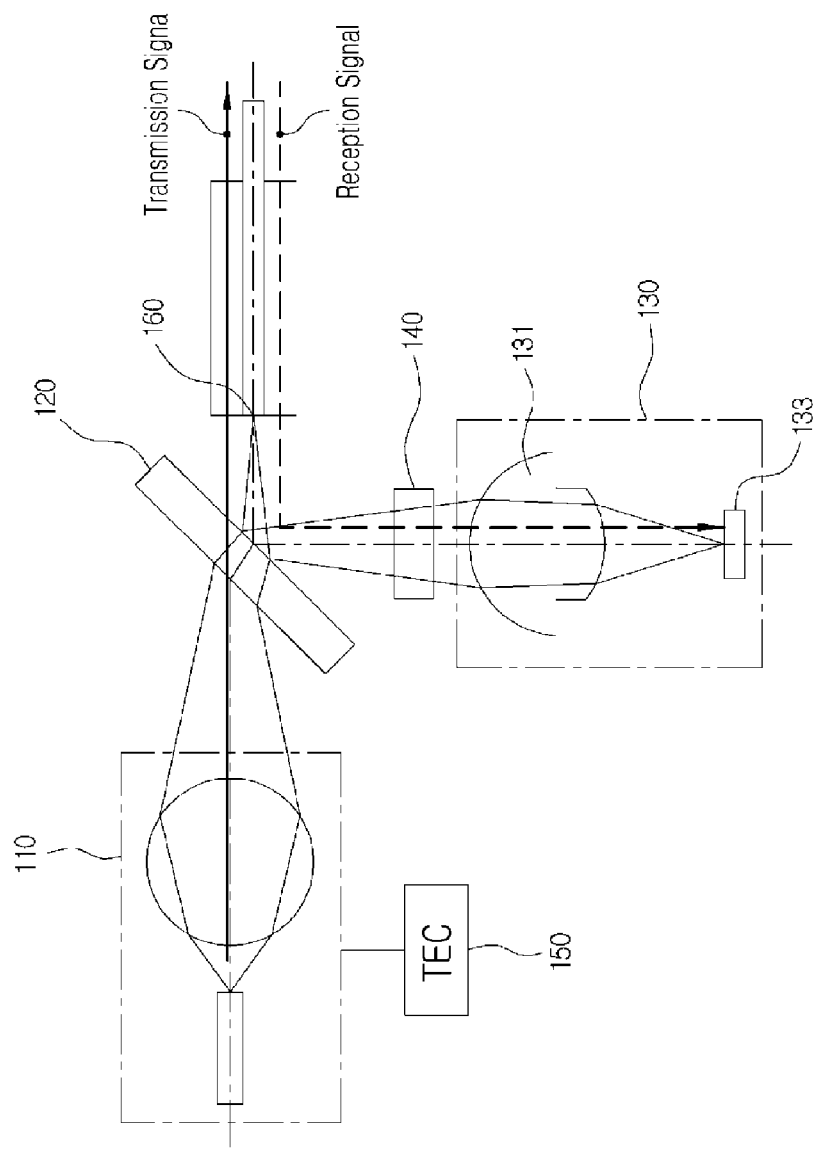
FIG. 2 is a view illustrating a schematic configuration of a bi-directional optical transceiver module according to at least one first embodiment of the present disclosure.

FIG. 2 is a view of a schematic configuration of a bi-directional optical transceiver module according to at least one first embodiment of the present disclosure.

As illustrated, the bi-directional optical transceiver module includes an optical transmission unit 110, a splitter 120, an optical reception unit 130, a reflected light-blocking optical filter unit 140, and a Thermo-Electric Cooler (TEC) 150 which is a thermoelectric semiconductor element. Other components of the bi-directional optical transceiver module, such as the optical transmission unit 110, the optical reception unit 130, and the Thermo-Electric Cooler (TEC) 150 comprise one or more processors and/or application-specific integrated circuits (ASICs).

The optical transmission unit 110 is configured to output a transmission signal.

The optical reception unit 130 is configured to input a reception signal and includes a condensing lens 131 and a light receiving element 133.

In at least one embodiment of the present disclosure, the optical transmission unit 110 and the optical reception unit 130 are configured to transmit and receive a transmission signal and a reception signal which have different wavelength values in a single channel.

The CWDM have 18 channels at a 20 nm interval within a range from 1270 nm to 1610 nm in central wavelength, and a bandwidth for each channel is ±7.5 nm. Thus, the wavelengths of a transmission signal and a reception signal are allocated and exist within the ±7.5 nm bandwidth for each channel.

For example, a channel having a CWDM central wavelength of 1350 nm may be configured such that a transmission signal and a reception signal have wavelengths of 1346 nm and 1352 nm, respectively, which are spaced apart from each other over about 2 nm, and the optical transmission unit 110 and the optical reception unit 130 may be configured to be capable of receiving transmission signals and reception signals having such wavelength values. In other words, the optical transmission unit 110 may be configured to output a transmission signal having the wavelength value of 1346 nm and the optical reception unit 130 may be configured to receive an input of a reception signal having the wavelength value of 1352 nm.

The splitter 120 is installed to be inclined vertically by a predetermined angle with respect to an incident direction of the transmission signal output from the optical transmission unit 110 and performs functions of causing the transmission signal to pass therethrough to be output to a outside (e.g., a receiving side, or a receiving terminal) (i.e., the optical transceiver module of the central station side or the optical transceiver module of the subscriber side) through the optical line (or optical cable) and reflecting an optical signal input from the outside through the optical line. The inclined angle of the splitter 120 with respect to the incident direction of the transmission signal output from the optical transmission unit 110 may range 30° to 60°. However, the inclined angle is usually determined as 45° in order to ensure good transmission and reception efficiency.

As described above, the splitter 120 is configured such that the transmission signal and the reception signal respectively have wavelength values within a CWDM single channel is bi-directionally transmitted and received through a single optical fiber ferrule 160.

According to at least one embodiment of the present disclosure, the bi-directional optical transceiver module is provided with a reflected light-blocking optical filter unit 140.

The reflected light-blocking optical filter unit 140 is configured to pass, as a reception signal, only an optical signal within a pre-set wavelength range allocated to the reception signal among optical signals reflected from the splitter 120 thereby blocking external reflected light.

Since the transmission signal output from the optical transmission unit 110 has a wavelength value included in the same channel as the reception signal input to the optical reception unit 130, the transmission signal may be reflected to the wavelength bandwidth of the reception signal, thereby affecting a characteristic.

Accordingly, the reflected light-blocking optical filter unit 140 is configured to block all of an internal refection signal input to the optical reception unit 130 and an external reflection (line reflection or Rayleigh backscattering) signal, and to separate the transmission signal existing in the single channel such that only an optical signal corresponding to the reception signal may be incident on the optical reception unit 130.

The reflected light-blocking optical filter unit 140 has a Band Pass Filter (BPF) characteristic that passes only an optical signal within a pre-set wavelength range including a wavelength value of the reception signal.

As illustrated in FIG. 2, the reflected light-blocking optical filter unit 140 may be provided as a built-in type for the bi-directional optical transceiver module. In addition, the reflected light-blocking optical filter unit 140 may be provided as an external-mounting type for the bi-directional optical transceiver module.

The reflected light-blocking optical filter unit 140 is configured such that the reception signal reflected from the splitter 120 and input to the reflected light-blocking optical filter unit 140 can be incident perpendicularly.

As described above, the bi-directional optical transceiver module according to the first embodiment of the present disclosure is configured such that an upstream signal and a downstream signal have different wavelength values in a single channel and bi-directional optical transmission and reception may be performed. As a result, according to various embodiments of the present disclosure, an advantage of an existing configuration in which an upstream signal and a downstream signal are allocated with the same wavelength value of a single channel is maintained as it is and link fail between optical communication networks which is a disadvantage of the existing configuration is minimized.

The TEC 150 is configured to perform a temperature adjustment of the optical transmission unit 110 in response to an external temperature. The TEC 150 is a kind of temperature adjustment device which prevents a transmission signal output from the optical transmission unit 110 from being affected by an external temperature change.

When the optical transmission unit 110 includes a Distributed Feedback-Laser Diode (DFB-LD), the wavelength value of the transmission signal output from the optical transmission unit 110 is changed at a rate of 0.1 nm/° C. per unit temperature by the external temperature change.

The TEC 150 causes the transmission signal output from the optical transmission unit 110 to be fixed to a wavelength value within a specific range even if the external temperature is changed. The range of fluctuation of the wavelength values of the upstream signal and the downstream signal is very small.

According to at least one embodiment of the present disclosure, the bi-directional optical transceiver module enables stable wavelength fixation in consideration of a wavelength change per unit temperature of the DFB-LD (about 0.1 nm/° C.) through a temperature adjustment device such as the TEC 150 or a heater.

When a temperature adjustment device such as the TEC 150 is provided inside the bi-directional optical transceiver module, a control circuit (not illustrated) capable of controlling the temperature adjustment device may be included.

The TEC 150 allows the transmission signal to satisfy a wavelength range of single channel in an external temperature range of −40 to +85° C.

Figure 3:
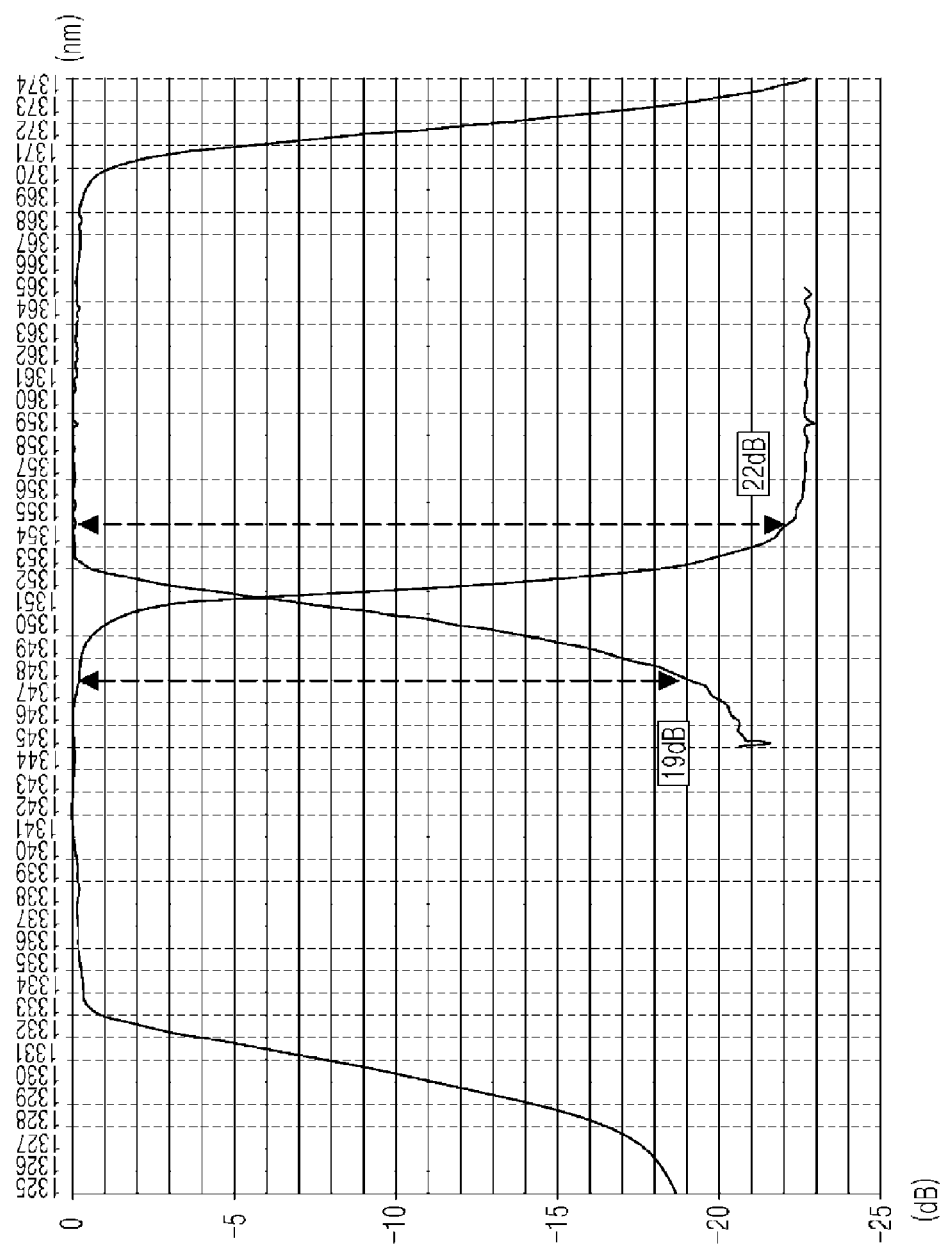
FIG. 3 is a graph of filter characteristics of a reflected light-blocking optical filter unit designed to receive each of an upstream signal and a downstream signal in a CWDM communication according to at least one embodiment of the present disclosure.

FIG. 3 is a graph of filter characteristics of a reflected light-blocking optical filter unit designed to receive each of an upstream signal and a downstream signal in a CWDM communication according to at least one embodiment of the present disclosure.

In the CWDM communication, a downstream signal of a central station side optical transceiver module is input as a reception signal to a subscriber side optical transceiver module, and an upstream signal of the subscriber side optical transceiver module is input as a reception signal to the central station side optical transceiver module. The upstream signal and the downstream signal are allocated with wavelengths such that the upstream signal and the downstream signal have different wavelength values in a CWDM single channel.

As a result, when the central wavelength of the CWDM single channel is 1350 nm, at a room temperature of 25° C., a wavelength value of 1352 nm may be allocated to the upstream signal and a wavelength value of 1346 nm may be allocated to the downstream signal. In addition, when a temperature adjustment device such as the TEC 150 is provided inside each of the central station side and subscriber side optical transceiver modules, the temperature adjustment device adjusts a desired LD wavelength through the temperature adjustment of the TEC 150. For example, the downstream signal is allocated with a wavelength value of 1348 nm and the upstream signal is allocated with a wavelength value of 1355 nm within a single channel.

FIG. 3 illustrates exemplary filter characteristics of the reflected light-blocking optical filter unit 140 which are respectively provided in a subscriber side optical transceiver module that receives a downstream signal and a central station side optical transceiver module which receives an upstream signal in a case where each of the optical transceiver modules is provided with the TEC 150 and a wavelength value of 1348 nm is allocated to the downstream signal and a wavelength value of 1355 nm is allocated to the upstream signal.

As illustrated in FIG. 3, the reflected light-blocking optical filter unit 140 in the subscriber side optical transceiver module that receives the downstream signal s configured to have a filter blocking characteristic (Iso1) of about 19 dB at the wavelength value of 1348 nm of the downstream signal. In addition, the reflected light-blocking optical filter unit 140 in the central station side optical transceiver module that receives the upstream signal is configured to have a filter blocking characteristic (Iso2) of about 22 dB at the wavelength of 1355 nm of the upstream signal.

Communication quality will vary depending on which level of filter blocking characteristic the reflected light-blocking optical filter unit 140 is designed to have. In at least one embodiment of the present description, the reflected light-blocking optical filter unit 140 may be configured to have an isolation characteristic of at least about 9 dB.

In order to improve the filter blocking characteristic of the reflected light-blocking optical filter unit 140, hereinafter, characteristics according to a form of light incident on the reflected light-blocking optical filter unit 140 will be discussed.

Figure 4:
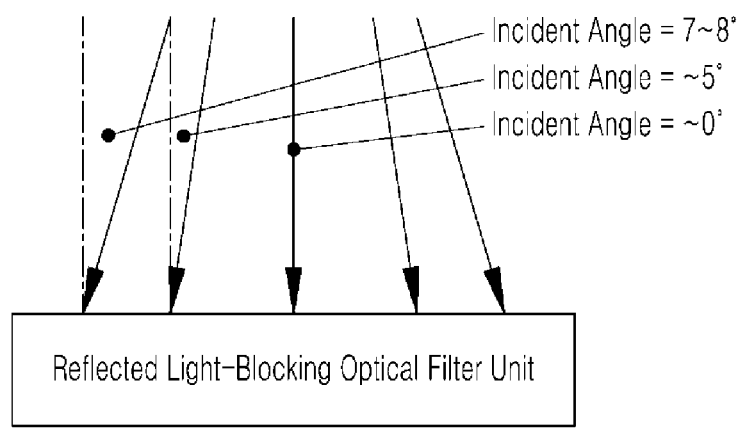
FIG. 4 is a view of a form of light incident on the reflected light-blocking optical filter unit from the bi-directional optical transceiver module illustrated in FIG. 2 according to at least one embodiment of the present disclosure.

FIG. 4 is a view of a form of light incident on the reflected light-blocking optical filter unit from the bi-directional optical transceiver module illustrated in FIG. 2.

The light incident on the splitter 120 through an optical fiber ferrule 160 diverges at 7 to 8 degrees in a half-value angle (in a case of an ordinarily available single mode optical fiber). When light diverging with a half-value angle of 7 to 8 degrees is incident on the reflected light-blocking optical filter unit 140 the angle of the incident light is referred to as an "incident angle" which is defined as an inclined angle of the input light with respect to a normal direction.

FIG. 4 is a view illustrating a change of light incident angle according to positions deviated from the center of the divergent light when the divergent light incident through the optical fiber ferrule 160 is incident on the reflected light-blocking optical filter unit 140 via the splitter 120. As illustrated in FIG. 4, when the divergent light is incident on the reflected light-blocking optical filter unit 140, the incident angle is increased toward the perimeter.

As compared to such divergent light, descriptions will be made with reference to FIG. 5 on an effect on a filter transmission character when a parallel light, of which an incident angle is 0 degree, is incident on the reflected light-blocking optical filter unit 140.

Figure 5:
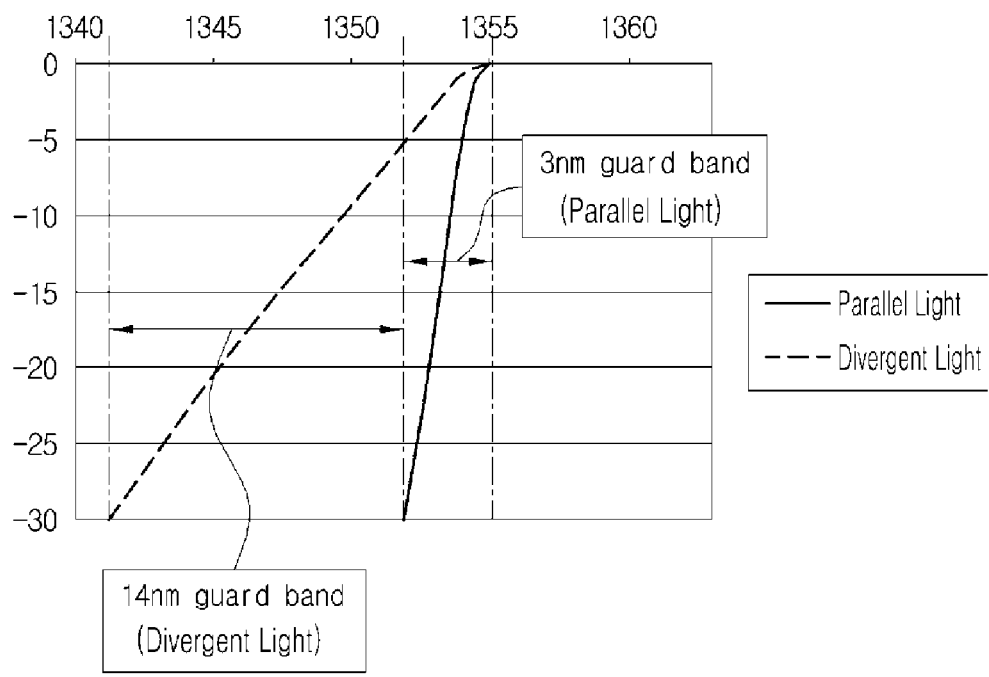
FIG. 5 is a graph of filter transmission characteristics of the reflected light-blocking optical filter unit for parallel light and divergent light according to at least one embodiment of the present disclosure.

FIG. 5 is a graph illustrating filter transmission characteristics of the reflected light-blocking optical filter unit for parallel light and divergent light.

As illustrated, in order for the reflected light-blocking optical filter unit 140 to have 30 dB as a light isolation value that represents a light blocking level, the divergent light requires a guard band of at least 14 nm at a reference wavelength of 1355 nm while the parallel light requires only a guard band of 3 nm.

Here, the guard band means a minimum wavelength interval required for satisfying a light isolation value. The guard band is narrowed in order to increase an integration degree of an information amount by narrowing a wavelength interval for optical transmission and reception channels in an optical communication network.

Accordingly, in consideration of the fact that the guard band is narrowed when parallel light is incident on the reflected light-blocking optical filter unit 140 as compared to a case where divergent light is incident, the present disclosure proposes a bi-directional optical transceiver module configured such that the form of incident light incident on the reflected light-blocking optical filter 140 becomes parallel light.

Hereinafter, descriptions will be made with reference to FIGS. 6 and 7.

Figure 6:
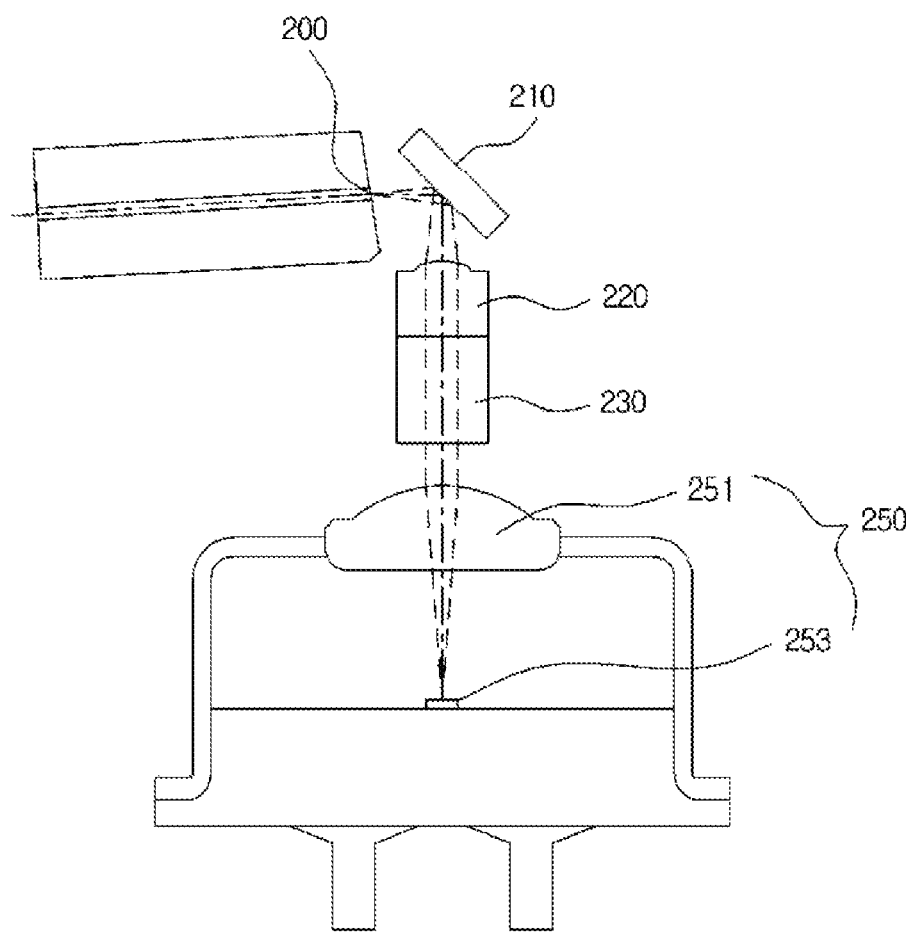
FIG. 6 is a view of a schematic configuration of a bi-directional optical transceiver module according to at least one second embodiment of the present disclosure.

FIG. 6 is a view illustrating a schematic configuration of a bi-directional optical transceiver module according to at least one second embodiment of the present disclosure.

The second embodiment of the present disclosure illustrated in FIG. 6 includes an optical transmission unit (not illustrated), a splitter 210, and a reflected light-blocking optical filter unit 230, similar to the first embodiment illustrated in FIG. 2, and the functions of respective components are the same. Thus, descriptions for the components will be omitted.

The second embodiment of the present disclosure includes a parallel light lens 220. The parallel light lens 220 is configured to convert and output the signal form of an optical signal reflected by the splitter 210 as parallel light.

Since the light incident on the reflected light-blocking optical filter unit 230 through the parallel light lens 220 becomes parallel light, the guard band required for satisfying a preset light isolation value is considerably narrowed as compared to divergent light as described above. As a result, the condensation degree of communication channels is greatly improved.

Meanwhile, when an ordinary parallel light lens is used, a length of a reception end up to the optical reception unit 250 is increased since the parallel light lens is large. In such a case, due to the increased length of the reception end, it is difficult to mount the parallel light lens in an external case having a size designated in SFP (Small Form Pluggable) or SFP+MSA (Multiple Source Agreement) standards.

Thus, the bi-directional optical transceiver module according to the second embodiment of the present disclosure is configured to have a reception end length which may be mounted in a case having a miniaturized size requested in the SFP or SFP+ standards while being provided with the parallel lens 220 in a stage in front of the reflected light-blocking optical filter unit 230 in order to enhance a condensation degree of optical channels.

For this purpose, in the second embodiment of the present disclosure, the parallel light lens 220 is characterized in that it does not have a metal lens barrel (unlike a commercially available parallel light lens) and has a short focal distance in a range of 1 mm to 2 mm. In addition, the parallel light lens 220 has an incident surface and a light emission surface opposite to the incident surface and an optical signal is received by the incident surface and output from the light emission surface. Here, the light emission surface is flat.

In the second embodiment of the present disclosure, in order to reduce the length of the reception end, the reflected light-blocking optical filter unit 230 is attached to the light emission surface of the parallel light lens 220 having the shape described above via a transparent ultraviolet (UV) epoxy.

When the reflected light-blocking optical filter unit 230 is directly attached to the light emission surface of the flat parallel light lens 220 via the transparent UV epoxy, the length of the reception end is reduced as compared to a configuration where the parallel light lens 220 and the reflected light-blocking optical filter unit 230 are separated from each other.

In addition, as illustrated in FIG. 6, when a condensing lens 251 included in the optical reception unit 250 is mounted on a cap enclosing a light reception lens 253 in an aspheric lens shape rather than in an external-mounting lens shape, the length of the reception end may be reduced.

Figure 7:
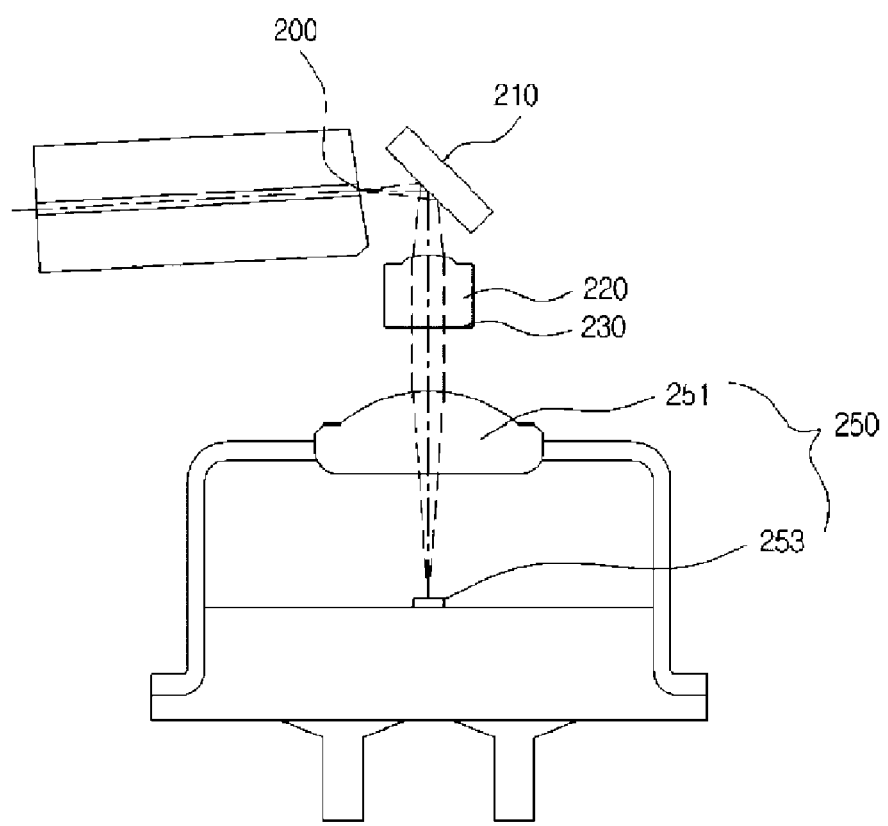
FIG. 7 is a view of a schematic configuration of a bi-directional optical transceiver module according to at least one third embodiment of the present disclosure.

FIG. 7 is a view illustrating a schematic configuration of a bi-directional optical transceiver module according to at least one third embodiment of the present disclosure.

As illustrated in FIG. 7, the bi-directional optical transceiver module according to the third embodiment of the present disclosure is also characterized by including a parallel light lens 220.

In addition, in the third embodiment of the present disclosure illustrated in FIG. 7, in order to reduce the length of the optical reception end, the light emission surface of the parallel light lens 220 is flat and the reflected light-blocking optical filter unit 230 is coated on the light emission surface of the parallel light lens 220 such that the parallel light lens 220 and the reflected light-blocking optical filter unit 230 are configured in an integrated form.

The embodiment of coating the reflected light-blocking optical filter unit 230 of the light emission surface of the parallel light lens 220 configures the reflected light-blocking optical filter unit 230 in a form of thin film and deposits the thin film filter on the light emission surface of the parallel light lens 220.

In such a case, the length of the optical reception end may be reduced by the thickness of the reflected light-blocking optical filter unit 230, thereby representing a structure which is optimized for miniaturizing the bi-directional optical transceiver module.

In addition, as described above with reference to FIG. 6, the parallel light lens 220 has a focal distance in the range of 1 mm to 2 mm which is shorter than that of an existing parallel light lens.

The third embodiment of the present disclosure illustrated in FIG. 7 has a form which may further miniaturize the bi-directional optical transceiver module as compared to the second embodiment of the present disclosure illustrated in FIG. 6.

Figure 8:
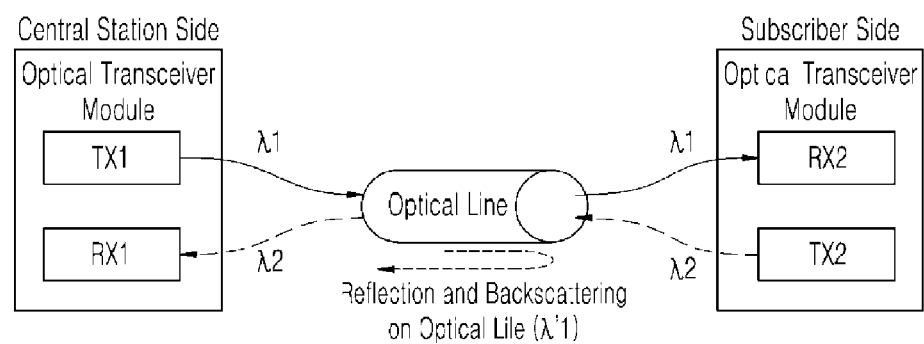
FIG. 8 is a schematic view of an optical communication using a bi-directional optical transceiver module according to at least one embodiment of the present disclosure.

FIG. 8 is a schematic view of an optical communication using a bi-directional optical transceiver module according to at least one embodiment of the present disclosure. Other components of the central station side optical transceiver module of FIG. 8, such as a transmission unit TX1 and a reception unit RX1 comprise one or more processors and/or application-specific integrated circuits (ASICs). Other components of the subscriber side optical transceiver module, such as a transmission unit TX2 and a reception unit RX2 comprise one or more processors and/or application-specific integrated circuits (ASICs).

As illustrated, the central station side optical transceiver module and the subscriber side optical transceiver module form a pair, and the bi-directional optical transceiver module of the present disclosure is used. Thus, an upstream signal to the central station side and a downstream signal to the subscriber side will have different wavelength values $\lambda 1$ and $\lambda 2$ which have a predetermined difference in interval within a CWDM single channel range.

In other words, the upstream signal and the downstream signal have different wavelength values $\lambda 1$ and $\lambda 2$ unlike the one or more embodiments described with respect to FIG. 1 in which the upstream signal and the downstream signal have the same wavelength value $\lambda 1$ of the CWDM single channel. Thus, degradation of a communication condition caused due to line reflection or Rayleigh backscattering $\lambda''1$ is prevented. In addition, since the upstream signal and the downstream signal are made to have different wavelength values $\lambda 1$ and $\lambda 2$ in the CWDM single channel, transmission efficiency through an optical line may be enhanced and an optical transmission amount may be increased.

Figure 9:
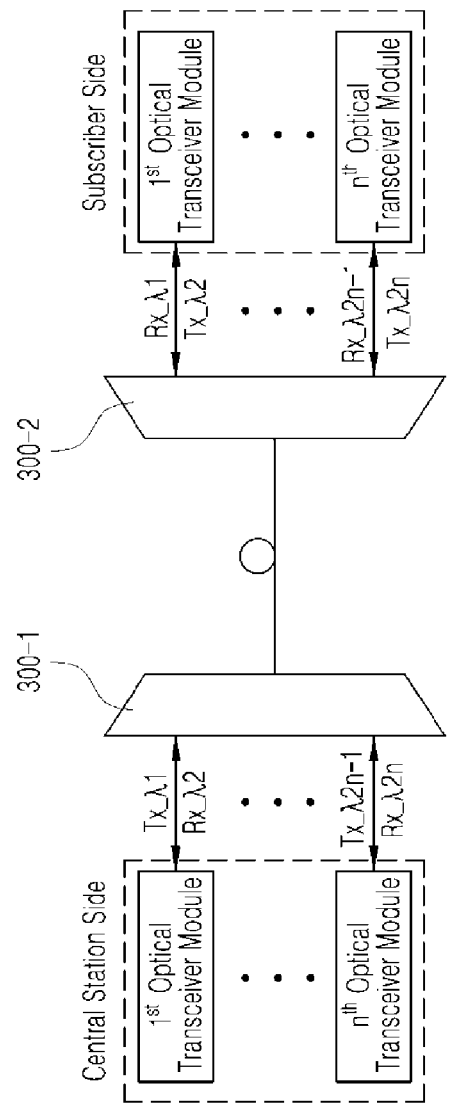
FIG. 9 is a view of a configuration of an optical communication system according to at least one embodiment of the present disclosure.

FIG. 9 is a view of a configuration of an optical communication system according to at least one embodiment of the present disclosure. FIG. 9 illustrates an optical communication system which uses a bi-directional optical transceiver module 100 according to at least one embodiment of the present disclosure configured to perform a communication such that an upstream signal and a downstream signal have different wavelength values $\lambda 2n-1$ and $\lambda 2n$ (here, n is a natural number which equal to or larger than 1) within a single channel.

As illustrated, n optical transceiver modules of the central station side and n optical transceiver modules of the subscriber side pair up each other to transmit and receive an upstream signal and a downstream signal, and for the purpose of communication through an optical line, a multiplexer/demultiplexer 300-1 and 300-2 are provided to the central station side and the subscriber side, respectively. Other components of the optical communication system illustrated in FIG. 9, such as $1^{st}$ thru nth optical transceiver modules of the central station side optical transceiver module, $1^{st}$ thru nth optical transceiver modules of the subscriber side optical transceiver module, the multiplexer/demultiplexer 300-1 and 300-2 comprise one or more processors and/or application-specific integrated circuits (ASICs).

Figure 10:
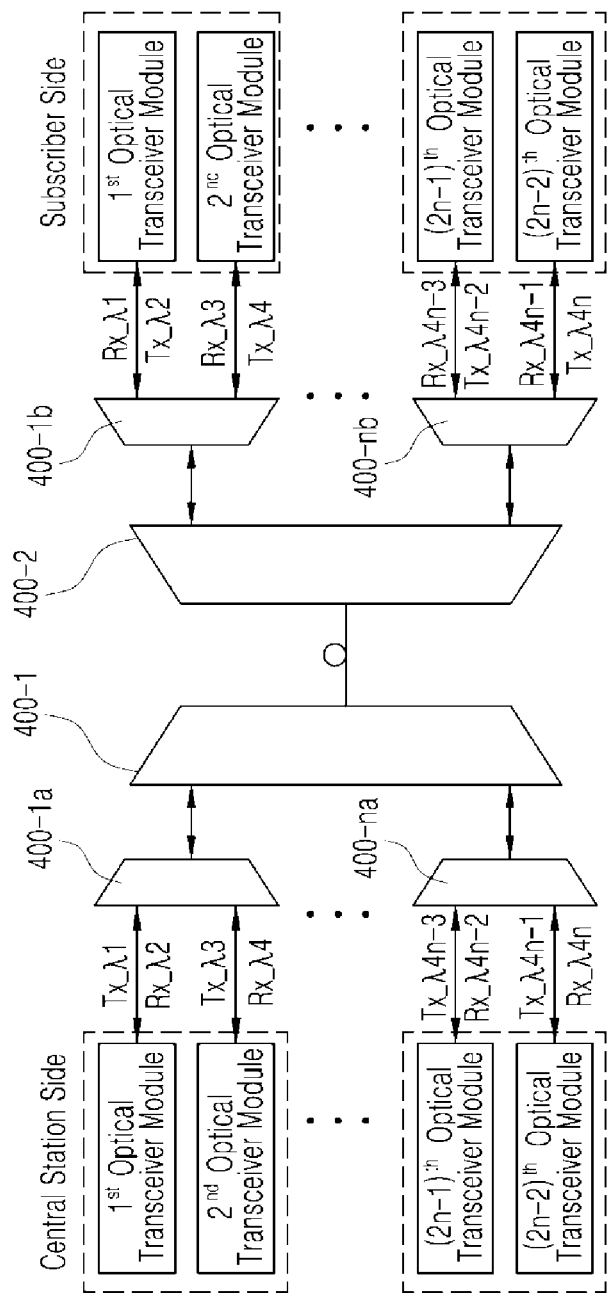
FIG. 10 is a view of an optical communication system using a bi-directional optical transceiver module, according to at least another embodiment of the present disclosure.

FIG. 10 is a view illustrating an optical communication system using a bi-directional optical transceiver module, according to at least another embodiment of the present disclosure. As illustrated, the optical communication system has a configuration in which the central station side and the subscriber side pair up with reference to an optical line. Hereinafter, the optical communication system will be described with reference to the central station side.

The optical communication system illustrated in FIG. 10 uses bi-directional optical transceiver module in which an upstream signal and a downstream signal have different wavelength values in a single channel, each two optical transceiver modules provided in the central station side pair up such that two upstream signals and two downstream signals therebetween have different wavelength values $\lambda 4n-3$, $\lambda 4n-2$ and $\lambda 4n-1$, $\lambda 4n$ (here, n is a natural number which is equal to or larger than 1) in a single channel. In other words, the optical communication system illustrated in FIG. 9 allocates wavelengths to an upstream signal and a downstream signal such that each of the upstream signal and the downstream signal has one wavelength value and the wavelength values of the upstream signal and the downstream signal are different from each other. However, the optical communication system illustrated in FIG. 10 allocates wavelengths to upstream signals and downstream signals such that each of the upstream signals and the downstream signals has two different wavelength values $\lambda 4n-3$, $\lambda 4n-2$ and $\lambda 4n-1$, $\lambda 4n$.

The optical communication system of the present disclosure is configured to use bi-directional optical transceiver modules according to at least one embodiment of the present disclosure such that an optical communication is performed through a plurality of upstream signals having different wavelength values and a plurality of downstream signals having different wavelength values in which the wavelength values have a predetermined difference in interval in a single channel.

The multiplexers/demultiplexers 400-1a, . . . , 400-na are additionally included separately from the existing multiplexer/demultiplexer 400-1. In addition, the multiplexers/demultiplexers 400-1a, . . . , 400-na connected to a plurality of bi-directional optical transceiver modules so as to perform multiplexing or inverse multiplexing of the upstream signals and the downstream signals thereof. Other components of the optical communication system illustrated in FIG., such as the multiplexers/demultiplexers 400-1a thru multiplexers/demultiplexers 400-na, the multiplexer/demultiplexer 400-1 of the central station side optical transceiver module, the multiplexers/demultiplexers 400-1b thru multiplexers/demultiplexers 400-nb, and the multiplexer/demultiplexer 400-2 of the subscriber side optical transceiver module comprise one or more processors and/or application-specific integrated circuits (ASICs).

Since the configurations of a plurality of bi-directional optical transceiver modules and the multiplexers/demultiplexers 400-1b, . . . , 400-nb illustrated in the subscriber side in FIG. 10 correspond to those of the central station side, the descriptions thereof will be omitted.

Various embodiments of the present disclosure may provide an optical communication system in which wavelength separation is performed by applying a temperature adjustment laser technology and a reception end reflection blocking filter is operated according to a separated wavelength value so that the optical communication system may be less affected by reflection and backscattering. In addition, according to at least one embodiment of the present disclosure, high capacity data is separated into a plurality of wavelengths using a bi-directional high-density optical transceiver and transmitted to a single optical line so that optical line transmission efficiency can be improved as compared to a case where the same wavelength is used in a single channel. As a result, the cost for increasing an optical transmission capacity may be minimized.

In addition, a bi-directional optical transceiver module according to at least one embodiment of the present disclosure may enhance a condensation degree of a communication channel using parallel light and may be mounted in a miniaturized case required by the SFP or SFP+ standard.

Further, when at least one embodiment of the present disclosure is applied, the entire optical network structure is considerably simplified as compared to applying an ordinary CWDM 2 channel optical transceiver.

Although the present disclosure has been described in conjunction with exemplary embodiments, the present disclosure is not limited to the aforementioned embodiments and various modifications and changes, various modifications, additions and substitutions are possible, without departing from the characteristics of the disclosure made by those skilled in the art to which the present disclosure pertains. Therefore, the subject matter of the present disclosure should be identified only by the following appended claims, and all equivalents or equivalent modifications thereof should be construed as falling within the scope of the claimed invention. Specific terms used in this disclosure and drawings are used for illustrative purposes and not to be considered as limitations of the present disclosure.

The invention claimed is:

1. A bi-directional optical transceiver module, comprising:
    an optical transmission unit configured to output a transmission signal, wherein the transmission signal is an upstream signal having first wavelength value allocated within a single channel;
    an optical reception unit configured to receive a reception signal, wherein the reception signal is a downstream signal having second wavelength value allocated within the single channel, and the first wavelength value and the second wavelength value are different each other allocated within the single channel, and
        wherein the single channel is a central wavelength of a coarse wavelength division multiplexed channel;
    a splitter inclined with respect to an incident direction of the transmission signal output from the optical transmission unit, and configured to
        transmit the transmission signal having the first wavelength value allocated within the single channel to an outside through the single channel, and
        reflect optical signals input from the outside, the optical signals including the reception signal having the second wavelength value allocated within the single channel;
    a reflected light-blocking optical filter unit configured to pass, as the reception signal among the optical signals reflected by the splitter, an optical signal within a preset wavelength range including the second wavelength value, la blocking an internal reflection signal and an external reflection signal and separating the first wavelength value of the transmitting signal existing within the single channel such that the optical signal corresponding to the reception signal having the second wavelength value is incident on the optical reception unit, wherein the optical signal is converted in a form of parallel light; and
    a parallel light lens arranged between the splitter and the reflected light-blocking optical filter unit, and configured to convert and transmit the reflected optical signals in a form of the parallel light.

2. The bi-directional optical transceiver module of claim 1, further comprising:
    a thermoelectric semiconductor element configured to perform a temperature adjustment of the optical transmission unit in response to an external temperature.

3. The bi-directional optical transceiver module of claim 1, wherein the parallel light lens includes an incident surface to receive the reflected optical signals, and a light emission surface to output the parallel light converted from the reflected optical signals, wherein the light emission surface is opposite to the incident surface, and flat in shape.

4. The bi-directional optical transceiver module of claim 3, wherein the reflected light-blocking optical filter unit is attached to the light emission surface of the parallel light lens by a transparent ultraviolet (UV) epoxy.

5. The bi-directional optical transceiver module of claim 3, wherein the reflected light-blocking optical filter unit is configured to be a film filter coated on the light emission surface of the parallel light lens.

6. The bi-directional optical transceiver module of claim 1, wherein the optical reception unit includes:
    a light reception lens,
    a cap enclosing the light reception lens, and
    a condensing lens mounted on the cap.

7. An optical communication system, comprising:
    a plurality of bi-directional optical transceiver modules configured to transmit and receive a plurality of transmission signals and reception signals having different wavelength values allocated within a single channel, wherein the single channel is a central wavelength of a coarse wavelength division multiplexed channel; and
    a multiplexer/demultiplexer connected to the plurality of bi-directional optical transceiver modules, and configured to multiplex or demultiplex the plurality of transmission signals and reception signals having different wavelengths,
    wherein each of the bi-directional optical transceiver modules comprises:
    an optical transmission unit configured to output a transmission signal, wherein the transmission signal is an upstream signal having first wavelength value allocated within the single channel;
    an optical reception unit configured to receive a reception signal, wherein, wherein the reception signal is a downstream signal having second wavelength value allocated within the single channel, and the first wavelength value and the second wavelength value are different each other allocated within the single channel;

a reflected light-blocking optical filter unit configured to pass, as the reception signal among optical signals, an optical signal within a preset wavelength range including the second wavelength value, by blocking an internal reflection signal and an external reflection signal and separating the first wavelength value of the transmitting signal existing within the single channel such that the optical signal corresponding to the reception signal having the second wavelength value is incident on the optical reception unit, wherein the optical signal is converted in a form of parallel light; and a parallel light lens arranged between the splitter and the reflected light-blocking optical filter unit, and configured to convert and transmit the reflected optical signals in a form of the parallel light.

8. The optical communication system of claim 7, wherein said each of the bi-directional optical transceiver modules further comprises:

a splitter inclined with respect to an incident direction of the transmission signal output from the optical transmission unit, and configured to transmit the transmission signal having the first wavelength value allocated within the single channel to an outside, reflect the optical signals including the reception signal having the second wavelength value allocated within the single channel input from the outside, and transmit the optical signals to the reflected light-blocking optical filter unit.

9. The optical communication system of claim 7, wherein said each of the bi-directional optical transceiver modules further comprises:

a thermoelectric semiconductor element configured to perform a temperature adjustment of the optical transmission unit in response to an external temperature.

* * * * *